United States Patent
Yu et al.

(10) Patent No.: US 11,310,147 B2
(45) Date of Patent: Apr. 19, 2022

(54) ADVERTISING ROUTE

(71) Applicant: NEW H3C TECHNOLOGIES CO., LTD., Hangzhou (CN)

(72) Inventors: Qingyan Yu, Beijing (CN); Zhi Tan, Beijing (CN); Yan Chen, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 184 days.

(21) Appl. No.: 16/615,393

(22) PCT Filed: May 17, 2018

(86) PCT No.: PCT/CN2018/087341
§ 371 (c)(1),
(2) Date: Nov. 20, 2019

(87) PCT Pub. No.: WO2018/214803
PCT Pub. Date: Nov. 29, 2018

(65) Prior Publication Data
US 2021/0297339 A1  Sep. 23, 2021

(30) Foreign Application Priority Data
May 24, 2017 (CN) .......................... 201710375325.1

(51) Int. Cl.
*H04W 40/34* (2009.01)
*H04L 45/023* (2022.01)

(52) U.S. Cl.
CPC ................................. *H04L 45/023* (2013.01)

(58) Field of Classification Search
CPC ..................................................... H04L 45/023
(Continued)

(56) References Cited

U.S. PATENT DOCUMENTS

2006/0221971 A1* 10/2006 Andrieux .............. H04L 45/502
370/392
2006/0233181 A1* 10/2006 Raszuk ................... H04L 45/02
370/401

(Continued)

FOREIGN PATENT DOCUMENTS

CN      1761244 A      4/2006
CN   101656680 A      2/2010
(Continued)

OTHER PUBLICATIONS

Publication CN1761244A•Apr. 19, 2006.*
(Continued)

*Primary Examiner* — Faisal Choudhury
(74) *Attorney, Agent, or Firm* — McCoy Russell LLP

(57) ABSTRACT

In an example, when a network device receives a route advertised by a Border Gateway Protocol (BGP) neighbor, the network device distributes the route to hardware thereof, records the route into a linked list of routes to be advertised, and determines a BGP state of the device. If the BGP state indicates waiting to advertise a route, the network device updates the BGP state to advertising a route after a set time length and advertises a route in the linked list of routes to be advertised. If the BGP state indicates advertising a route, the network device advertises a route in the linked list of routes to be advertised.

12 Claims, 4 Drawing Sheets

(58) Field of Classification Search
USPC .......................................................... 370/255
See application file for complete search history.

(56) References Cited

U.S. PATENT DOCUMENTS

| | | | | |
|---|---|---|---|---|
| 2013/0201909 | A1* | 8/2013 | Bosch | H04L 45/64 370/328 |
| 2014/0056176 | A1 | 2/2014 | Ramesh et al. | |
| 2014/0211651 | A1 | 7/2014 | Venkatachalapathy et al. | |
| 2016/0191325 | A1* | 6/2016 | Pacella | H04L 45/04 370/254 |

FOREIGN PATENT DOCUMENTS

| CN | 102769570 A | 11/2012 |
|---|---|---|
| CN | 103516612 A | 1/2014 |
| CN | 103581013 A | 2/2014 |
| CN | 103634212 A | 3/2014 |
| CN | 104394104 A | 3/2015 |
| CN | 106411729 A | 2/2017 |
| CN | 106549866 A | 3/2017 |

OTHER PUBLICATIONS

ISA State Intellectual Property Office of the People's Republic of China, International Search Report Issued in Application No. PCT/CN2018/087341, dated Jun. 29, 2018, WIPO, 4 pages.

ISA State Intellectual Property Office of the People's Republic of China, Written Opinion of the International Searching Authority Issued in Application No. PCT/CN2018/087341, dated Jun. 29, 2018, WIPO, 3 pages.

State Intellectual Property Office of the People's Republic of China, Office Action and Search Report Issued in Application No. 201710375325.1, dated Nov. 29, 2019, 15 pages. (Submitted with Partial Translation).

State Intellectual Property Office of the People's Republic of China, Office Action and Search Report Issued in Application No. 201710375325.1, dated Jul. 22, 2020, 15 pages (Submitted with Machine Translation).

* cited by examiner

ADVERTISING ROUTE

CROSS-REFERENCE TO RELATED APPLICATIONS

The present application is a U.S. National Phase of International Patent Application Serial No. PCT/CN2018/087341 entitled "ROUTE ADVERTISEMENT," filed on May 17, 2018. International Patent Application Serial No. PCT/CN2018/087341 claims priority to Chinese Patent Application No. 201710375325.1 filed on May 24, 2017. The entire contents of each of the above-cited applications are hereby incorporated by reference in their entirety for all purposes.

BACKGROUND

A network device supporting a Border Gateway Protocol (BGP) (called a BGP device for short) may distribute an optimum route learned by the network device to a hardware to direct flow forwarding, and may also advertise the optimum route to a BGP neighbor.

The BGP device may first distribute a route to hardware and then advertise the route to a neighbor after the distribution succeeds. However, to maintain a high performance, the BGP device will not wait to advertise the route until the route is distributed to the hardware successfully. Therefore, in case of a large number of routes and the like, it may occur that a route has been already advertised to a neighbor but not distributed to the hardware yet. Thus, if the BGP device receives a data flow of the route, the data flow will be interrupted for a short time because the route is not distributed to the hardware yet.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure, rather than all the examples of the present disclosure. Other examples achieved by those of ordinary skill in the art based on the examples in the present disclosure without creative work shall all fall into the scope of protection of the present disclosure.

In an example of the present disclosure, route advertising may be controlled to ensure that a route can be successfully distributed to hardware before being advertised, thereby avoiding that the route is already advertised but not distributed to the hardware yet and thus preventing flow interruption.

To illustrate more clearly the objective, technical solutions and advantages of the present disclosure, the present disclosure will be described in detail in combination with the drawings and specific examples below.

Figure 1A:
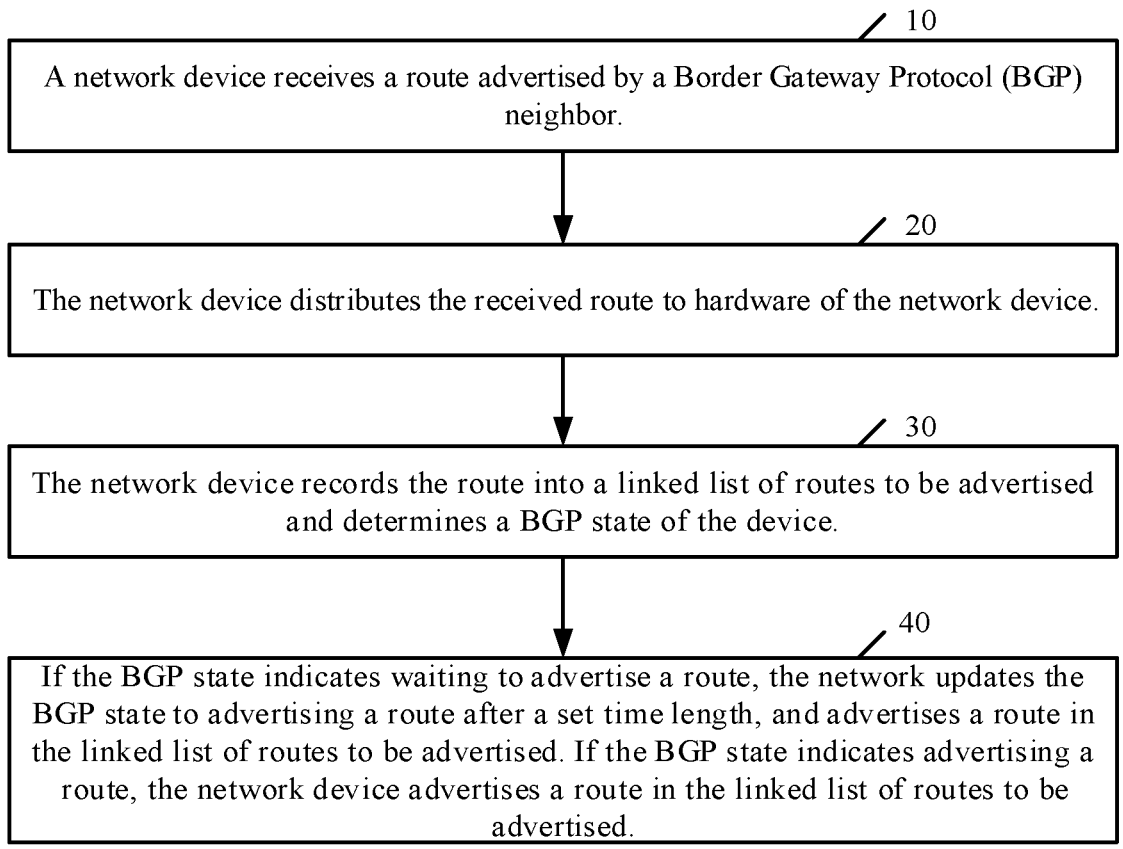
FIG. 1A is a flowchart illustrating a method according to an example of the present disclosure.

FIG. 1A is a flowchart illustrating a method according to an example of the present disclosure. The process may be applied to a BGP-supporting network device. The network device may be a BGP-supporting device such as a router, a switch, a virtual machine, a server, or a mobile terminal.

As shown in FIG. 1A, the process may include the following blocks.

At block 10, a network device may receive a route advertised by a Border Gateway Protocol (BGP) neighbor.

At block 20, the network device may distribute the received route to hardware of the network device.

At block 30, the network device may record the received route into a linked list of routes to be advertised and determine a BGP state of the device.

At block 40, if the BGP state indicates waiting to advertise a route, the network device may update the BGP state to advertising a route after a set time length, and advertise a route in the linked list of routes to be advertised. If the BGP state indicates advertising a route, the network device may advertise a route in the linked list of routes to be advertised.

Figure 1B:
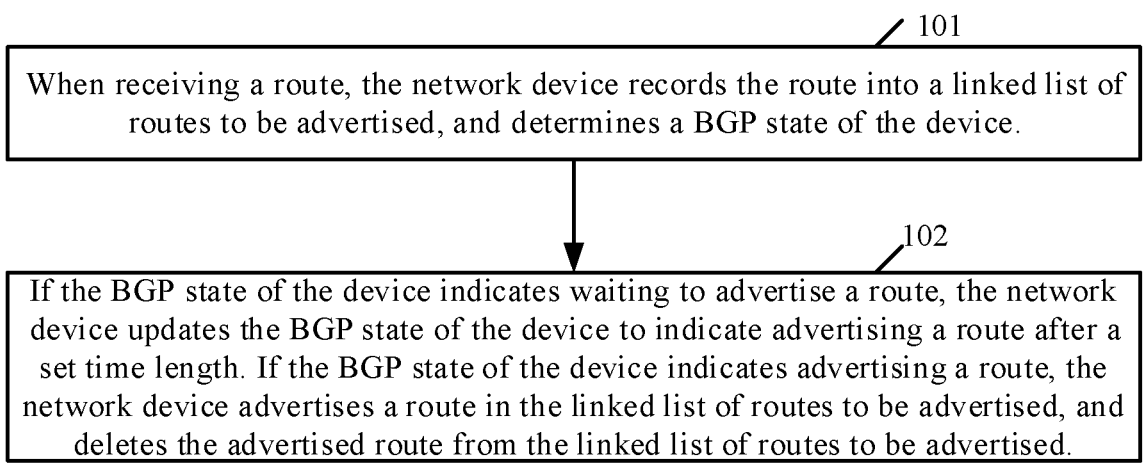
FIG. 1B is a flowchart illustrating a method according to another example of the present disclosure.

The method shown in FIG. 1A will be described below in detail in combination with an example. FIG. 1B is a flowchart illustrating a method according to an example of the present disclosure.

At block 101, when receiving a route, the network device may record the route into a linked list of routes to be advertised, and determine a BGP state of the network device.

In an example, block 101 may further include that the network device distributes the received route to hardware. The distribution of the route to the hardware and the recording of the route into the linked list are independent of each other and will not affect each other.

At block 102, if the BGP state of the device indicates waiting to advertise a route, the network device may update the BGP state of the device to indicate advertising a route after a set time length. If the BGP state of the device indicates advertising a route, the network device may advertise a route in the linked list of routes to be advertised, and delete the advertised route from the linked list of routes to be advertised.

As can be seen from block 102, in the present disclosure, a route in the linked list of routes to be advertised may be advertised only when the BGP state of the device indicates advertising a route. When the BGP state of the device indicates waiting to advertise a route, no route will be advertised. A duration for not advertising a route may be the set time length as mentioned above. Compared with an existing scheme of advertising a route upon receiving the route, route advertising can be controlled to guarantee that a route can be successfully distributed to hardware before being advertised, thereby avoiding that the route is already advertised but not distributed to the hardware yet and thus preventing flow interruption.

In an example in the present disclosure, updating the BGP state after the set time length in the above block 102 specifically includes the following sub-blocks.

At sub-block a1, the network device may determine whether a WAIT-TIMER corresponding to the device has been started. If yes, sub-block a2 may be performed; and if no, sub-block a3 may be performed.

At sub-block a2, the network device may await the WAIT-TIMER to expire, and update the BGP state of the network device at the expiry of the WAIT-TIMER.

In other words, when determining that the WAIT-TIMER corresponding to the network device has been started at sub-block a1, the network device may await the WAIT-TIMER to expire at sub-block a2. When the WAIT-TIMER expires, the network device may update the BGP state of the device to indicate advertising a route.

At sub-block a3, the network device may start the WAIT-TIMER corresponding to the network device, and await the started WAIT-TIMER to expire. When the WAIT-TIMER expires, the network device may update the BGP state of the network device.

In other words, when determining that the WAIT-TIMER corresponding to the network device has not been started at sub-block a1, the network device may start the WAIT-TIMER corresponding to the network device and await the WAIT-TIMER to expire at sub-block a3. When the WAIT-TIMER expires, the network device may update the BGP state of the device to indicate advertising a route.

As can be seen from sub-block a1 to sub-block a3, if the BGP state of the network device indicates waiting to advertise a route, advertising of a route in the linked list of routes to be advertised may be controlled to pause, and a time length of the pause may be from a current moment to when the WAIT-TIMER corresponding to the network device expires. In an example of in the present disclosure, the initial BGP state of the network device may indicate waiting to advertise a route, and by means of a WAIT-TIMER in combination with sub-block a1 to sub-block a3 as described above, it may be achieved that a first route is advertised after being successfully distributed to hardware.

In an example, when the WAIT-TIMER corresponding to the network device expires, the WAIT-TIMER may be deleted.

In an example of the present disclosure, a RESET-TIMER corresponding to the network device may be started after the BGP state of the network device is updated at the above block 102. When the BGP state of the network device indicates advertising a route, if the network device does not advertise a route for a long time and the RESET-TIMER expires, the BGP state of the network device may be updated to indicate waiting to advertise a route.

In the present disclosure, when the BGP state of the network device indicates advertising a route, the network device may determine whether the linked list of routes to be advertised is empty after advertising a route in the linked list and deleting the advertised routes from the linked list. If no, the RESET-TIMER may be reset and the operation of advertising a route in the linked list is continued. If yes, the RESET-TIMER may be awaited to expire, and when the RESET-TIMER expires, the BGP state of the network device may be updated to indicate waiting to advertise a route. In an example, to ensure that a route is advertised after being successfully distributed to hardware, the time length of the RESET-TIMER may be set less than or equal to the time length of the WAIT-TIMER.

The process shown in FIG. 1 will be described below based on the above two timers: the WAIT-TIMER and the RESET-TIMER.

Figure 2:
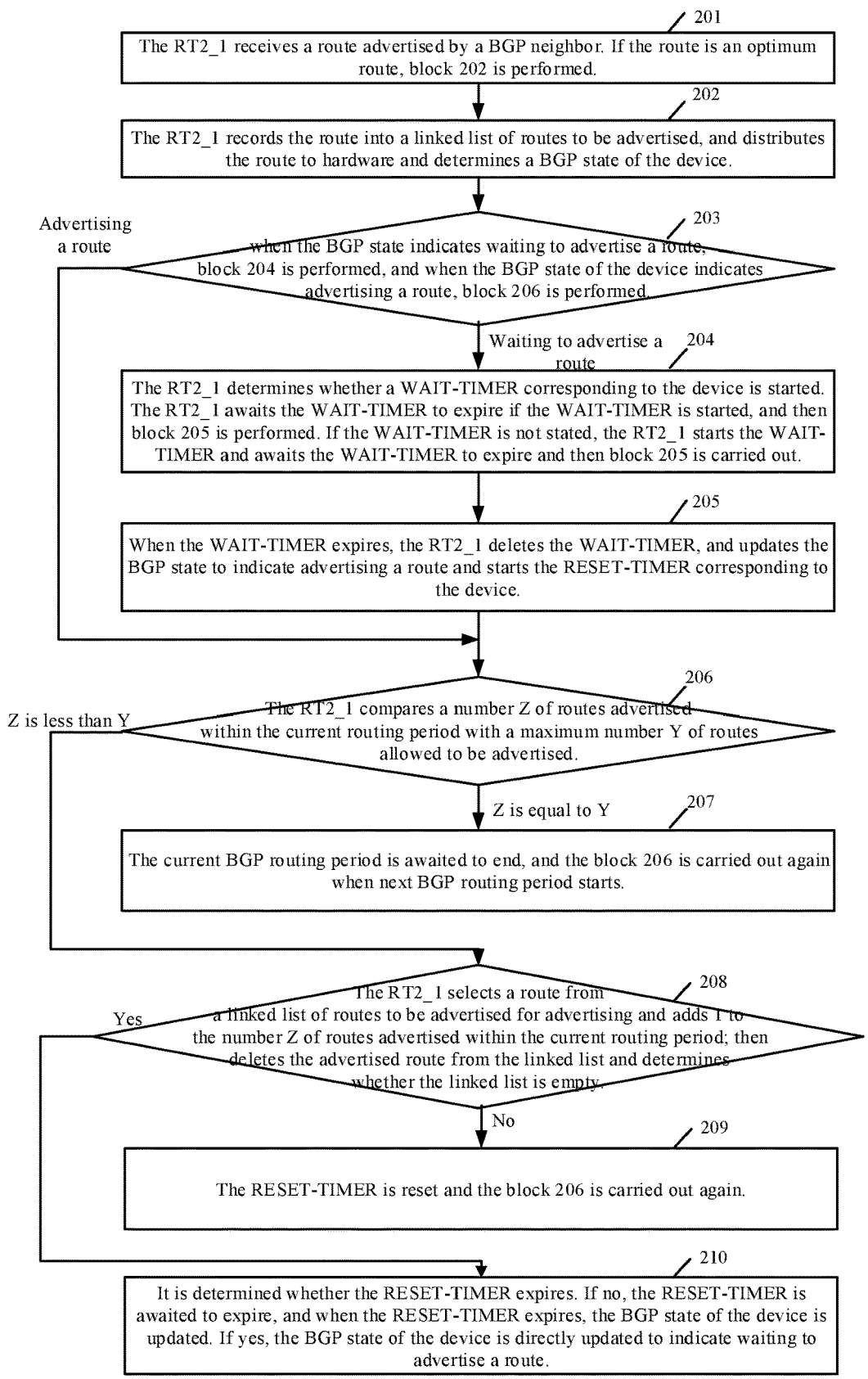
FIG. 2 is a flowchart illustrating an example of the present disclosure.

FIG. 2 is a flowchart illustrating an example of the present disclosure. The process is applied to a network device (denoted as RT2_1). As shown in FIG. 2, the process may include the following blocks.

At block 201, the RT2_1 may receive a route advertised by a BGP neighbor. If the route is an optimum route, block 202 may be performed.

The received route does not exist in all the existing local routes of the RT2_1.

At block 202, the RT2_1 may record the route into a linked list of routes to be advertised, and distribute the route to hardware and determine a BGP state of the RT2_1.

In an example, the RT2_1 may distribute a route to hardware according to a predetermined routing period, where the routing period may be 1 second. The RT2_1 distributes the route to the hardware, which specifically includes: before distributing the route to the hardware, comparing a number L of routes distributed to the hardware within the current routing period with a maximum number X of routes allowed to be distributed to the hardware; if L is less than X, distributing the route to the hardware and adding 1 to the number L of routes distributed to the hardware within the current routing period; and if L is equal to X, waiting for the current routing period to end and distributing the route to the hardware in a next routing period. It needs to be noted that, in the present disclosure, for each routing period, a number L of routes distributed to the hardware within the routing period may be initially a default value, for example, 0, which gradually increases with routes distributed to the hardware within this period. For example, once a route is distributed to the hardware in this period, the number L of routes distributed to the hardware in this period may be increased by 1.

At block 203, when the RT2_1 determines that BGP state of the RT2_1 indicates waiting to advertise a route, block 204 may be performed, and when the RT2_1 determines that BGP state of the RT2_1 indicates advertising a route, block 206 may be performed.

At block 204, the RT2_1 may determine whether a WAIT-TIMER corresponding to the RT2_1 has been started. The RT2_1 may await the WAIT-TIMER to expire if the WAIT-TIMER is started, and then block 205 may be performed. If the WAIT-TIMER is not stated, the RT2_1 may start the WAIT-TIMER and await the WAIT-TIMER to expire and then block 205 may be carried out.

At block 205, when the WAIT-TIMER expires, the RT2_1 may delete the WAIT-TIMER, and update the BGP state of the RT2_1 to indicate advertising a route and start the RESET-TIMER corresponding to the RT2_1. Then, block 206 may be carried out.

At block 206, the RT2_1 may compare a number Z of routes advertised within the current routing period with a maximum number Y of routes allowed to be advertised. If Z is equal to Y, block 207 may be carried out. If Z is less than Y, block 208 may be carried out.

As described above, the routing period herein may be, for example, 1 second.

In the present disclosure, the Y is less than the X as above. Thus, it can be ultimately achieved that a number of routes advertised by the RT2_1 is less than a number of routes distributed to the hardware within each routing period such as 1 second, so as to ensure that a route can be successfully distributed to the hardware before being advertised as possible. Thus, the case that a route is advertised but not distributed to the hardware can be avoided and flow interruption can be prevented.

At block 207, the current BGP routing period may be awaited to end, and the block 206 may be carried out again when a next BGP routing period starts.

At block 208, the RT2_1 may select a route from a linked list of routes to be advertised for advertising and add 1 to the number Z of routes advertised within the current routing period. Then, the RT2_1 may delete the advertised route from the linked list of routes to be advertised and determine whether the linked list of routes to be advertised is empty. If no, block 209 may be carried out. If yes, block 210 may be carried out.

In another example of the present disclosure, for each routing period, a number Z of routes advertised within this routing period may be initially a default value, for example, 0, which gradually increases with routes advertised within this period. For example, once a route is advertised in this period, the number Z of routes advertised in this period may be increased by 1.

In an example, selecting a route from the linked list of routes to be advertised for advertising as described above specifically includes: forming a BGP-UPDATE packet with the selected route and advertising the BGP-UPDATE packet to a BGP neighbor.

At block 209, the RESET-TIMER may be reset and the block 206 may be carried out again. At this block, the current routing period may likely end or not. When the current routing period ends, the comparison operation at the block 206 may be performed in a next routing period.

It is noted that the block 209 may be carried out under a precondition that the linked list of routes to be advertised is not empty. When the linked list of routes to be advertised is not empty, it means that there is still an unadvertised route in the linked list of routes to be advertised, and thus it is desired to reset the RESET-TIMER so as to guarantee that the RESET-TIMER does not expire in the process of advertising the route.

In the present disclosure, when the current BGP routing period ends, the number Z of routes advertised within the BGP routing period may be cleared to zero.

It needs to be noted that in the present disclosure, the above process from block 206 to block 209 may be performed under a precondition that the RESET-TIMER does not expire. Of course, in a special case, when the RESET-TIMER expires in the process from block 206 to block 209, current operation may be directly interrupted.

At block 210, it may be determined whether the RESET-TIMER expires. If no, the RESET-TIMER may be awaited to expire, and when the RESET-TIMER expires, the BGP state of the device may be updated. If yes, the BGP state of the device may be directly updated to indicate waiting to advertise a route.

It is noted that the block 210 may be carried out under the precondition that the linked list of routes to be advertised is empty. When the linked list of routes to be advertised is empty, it means that there is no unadvertised route in the linked list of routes to be advertised. In this case, the BGP state of the device needs to be updated based on the expiry of the RESET-TIMER, so that the BGP state of the device may be updated from indicating advertising a route to indicating waiting to advertise a route.

By block 206 to block 210, all routes in the linked list of routes to be advertised can be completely advertised.

Thus, the process shown in FIG. 2 is completed.

Figure 3:
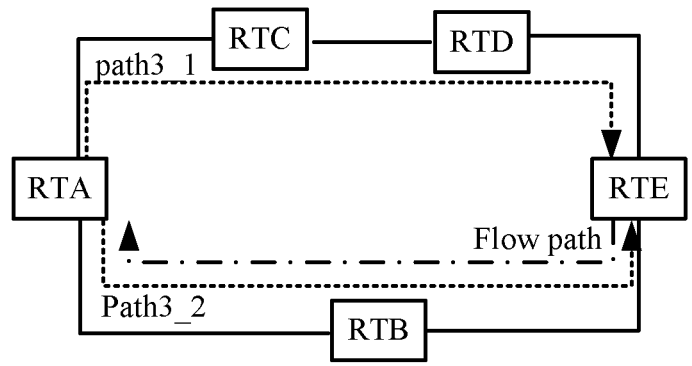
FIG. 3 is a schematic diagram illustrating an application network according to an example of the present disclosure.

Taking a network shown in FIG. 3 for example, the network shown in FIG. 3 shows five network devices: RTA to RTE, where a BGP neighbor relationship may be established between every two adjacent network devices of the five network devices RTA to RTE. It is assumed that two paths exist from RTA to RTE as follows:

Path 3_1: RTA→RTC→RTD→RTE;
Path 3-2: RTA→RTB→RTE.

A route on the RTA may be advertised to the RTE via the above two paths. In this way, two routes, that is, one route (denoted as route 3_1_1) that is advertised by the RTA and learned by the RTE through the neighbor RTB and one route (denoted as route 3_1_2) that is advertised by the RTA and learned by the RTE through the neighbor RTD, may be received by the RTE.

It is now assumed that the route 3_1_1 learned by the RTE through the neighbor RTB has a higher priority than the route 3_1_2 learned by the RTE through the neighbor RTD and the route 3_1_2 is a backup of the route 3_1_1. Then, the RTE may send a flow to the RTA based on the route 3_1_1.

As shown in FIG. 3, if a link between the RTA and the RTB fails, the RTB may notify a withdrawal message of the route 3_1_1 to the RTE when detecting that the link between the RTB and the RTA fails. After receiving the withdrawal message of the route 3_1_1, the RTE may reselect an optimum route to the RTA, for example, the route 3_1_2. The RTE will switch the flow sent to the RTA to the route 3_1_2.

Figure 4:
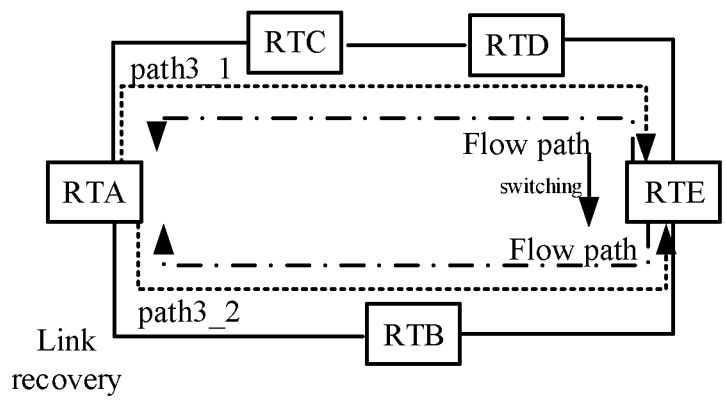
FIG. 4 is a schematic diagram illustrating switching back a flow according to an example of the present disclosure.

When the link between the RTA and the RTB is recovered, the RTA may re-advertise the route 3_1_1 to the RTB and the RTB may then advertise the route 3_1_1 to the RTE. As described above, the route 3_1_1 is more preferable, so the RTE may switch the flow sent to the RTA back to the route 3_1_1 from the route 3_1_2, which can be seen in the schematic diagram of FIG. 4 illustrating switching back a flow. If the RTB firstly advertises the route 3_1_1 to the RTE and then distributes the route 3_1_1 to the hardware, there will be a case that the flow is already sent to the RTB and the RTB cannot forward the flow temporarily because the route 3_1_1 is not distributed to the hardware in the above process of switching back the flow, thereby leading to a short flow interruption.

However, if the process provided in the present disclosure is adopted, when receiving the route 3_1_1 advertised by the RTA, the RTB may distribute the route to the hardware and record the route 3_1_1 into a linked list of routes to be advertised. As described above, the RTA may advertise the route 3_1_1 to the RTB after the link between the RTA and the RTB is recovered, which means that the RTB does not receive any route advertised by the RTA nor advertise the route from the RTA within a time period before the link recovery. In combination with the process as shown in FIG. 1 or FIG. 2, a BGP state of the RTB indicates waiting to advertise a route. Based on this, the RTB will first determine whether a WAIT-TIMER corresponding to the device is started at present. If yes, advertising of the route 3_1_1 will be paused until the WAIT-TIMER expires. If no, the WAIT-TIMER corresponding to the device is started, and advertising of the route 3_1_1 will be paused until the WAIT-TIMER expires. The time length of the WAIT-TIMER is set far greater than one routing period. The RTB will wait for at least a time period from a current moment to when the WAIT-TIMER expires before performing the advertising of the route 3_1_1 (the process is the same as the above blocks 205-208). Moreover, in combination with the description of the above block 202, when the RTB receives the route 3_1_1, if enough routes have been distributed to the hardware within the current routing period, the RTB cannot perform the operation of distributing a route to the hardware. In this case, the RTB may be required to wait at most until a next routing period starts (i.e., the time length of waiting to distribute to the hardware is less than one routing period), and then the RTB may perform the operation of distributing a route to the hardware. In the present disclosure, the time length of the WAIT-TIMER may be set far greater than a routing period, and therefore, the RTB can successfully distribute the route 3_1_1 to the hardware within the time period from the current moment to the expiry of the WAIT-TIMER. Obviously, the case that the flow is already sent to the RTB but cannot be forwarded temporarily because the route 3_1_1 is not distributed to the hardware in the process of switching back the flow can be avoided, thereby preventing a short flow interruption.

The forgoing are descriptions of the method provided in the present disclosure. The following descriptions will be made to an apparatus provided in the present disclosure.

Figure 5:
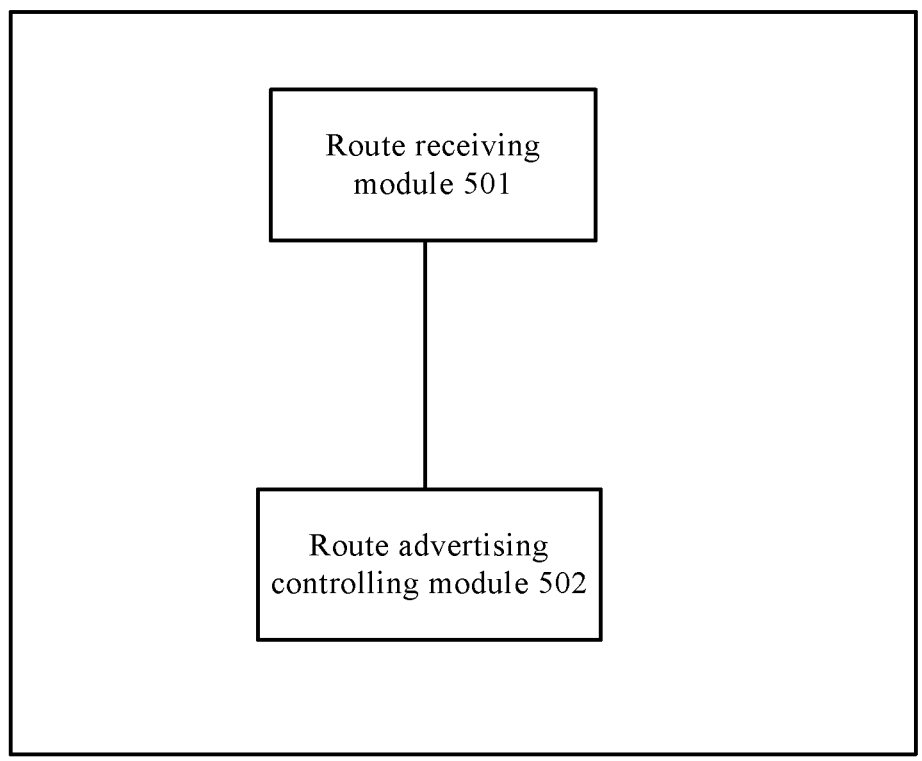
FIG. 5 is a diagram illustrating a structure of an apparatus according to an example of the present disclosure.

FIG. 5 is a schematic diagram illustrating a structure of an apparatus according to an example of the present disclosure. The apparatus may be applied to a BGP-supporting network device and may include different modules as follows.

A route receiving module 501 is configured to distribute a received route to hardware of the device, record the received route into a linked list of routes to be advertised and determine a BGP state of the device.

A route-advertising controlling module 502 is configured to: update the BGP state to advertising a route after a set time length when the route receiving module 501 determines that the BGP state of the device indicates waiting to advertise a route, and advertise a route in the linked list of routes to be advertised; and advertise a route in the linked list of routes to be advertised when the route receiving module 501 determines that the BGP state indicates advertising a route.

In an example, the route receiving module 501 distributes the route to the hardware of the device, which specifically includes:

comparing a number L of routes distributed to the hardware within a current routing period with a maximum number X of routes allowed to be distributed to the hardware when the route advertised by a BGP neighbor is received; distributing the received route to the hardware and adding 1 to the number L of routes distributed to the hardware within the current routing period when L is less than X; and waiting for the current routing period to end and distributing the received route to the hardware in a next routing period when L is equal to X.

In an example, the route-advertising controlling module 502 updates the BGP state after the set time length, which specifically includes:
determining whether a WAIT-TIMER corresponding to the device has been started;
awaiting the WAIT-TIMER to expire if yes;
starting the WAIT-TIMER if no, and then awaiting the WAIT-TIMER to expire; and
updating the BGP state to advertising a route when the WAIT-TIMER expires.

In an example, after the route-advertising controlling module 502 updates the BGP state, a RESET TIMER corresponding to the device may be also started.

In an example, the route-advertising controlling module 502 advertises a route in the linked list of routes to be advertised, which specifically includes:

comparing a number Z of routes advertised within the current routing period with a maximum number Y of routes allowed to be advertised;
selecting a route from the linked list of routes to be advertised for advertising and adding 1 to the number Z of routes advertised within the current routing period if Z is less than Y; repeating the operation of comparing Z with Y when the current routing period does not end, and repeating the operation of comparing Z with Y in a next routing period when the current routing period ends; and
awaiting the current routing period to end and repeating the operation of comparing Z with Y in a next routing period if Z is equal to Y.

In an example, when Z is less than Y, the route-advertising controlling module 502 may further perform the following operations after selecting a route from the linked list of routes to be advertised for advertising and adding 1 to the number Z of routes advertised within the current routing period:
deleting the advertised route from the linked list of routes to be advertised;
determining whether the linked list of routes to be advertised is empty;
resetting the RESET-TIMER if the linked list of routes to be advertised is not empty, and repeating the operation of comparing Z with Y;
determining whether the RESET-TIMER expires if the linked list of routes to be advertised is empty;
awaiting the RESET-TIMER to expire if the RESET-TIMER does not expire and updating the BGP state of the device to waiting to advertise a route when the RESET-TIMER expires; and
updating the BGP state of the device to waiting to advertise a route if the RESET-TIMER expires.

In an example of the present disclosure, within a same routing period, the maximum number X of routes allowed to be distributed to the hardware is greater than the maximum number Y of routes allowed to be advertised; and the time length of the RESET-TIMER is set greater than the time length of the WAIT-TIMER.

Thus, the descriptions on the structure of the apparatus shown in FIG. 5 are completed.

Figure 6:
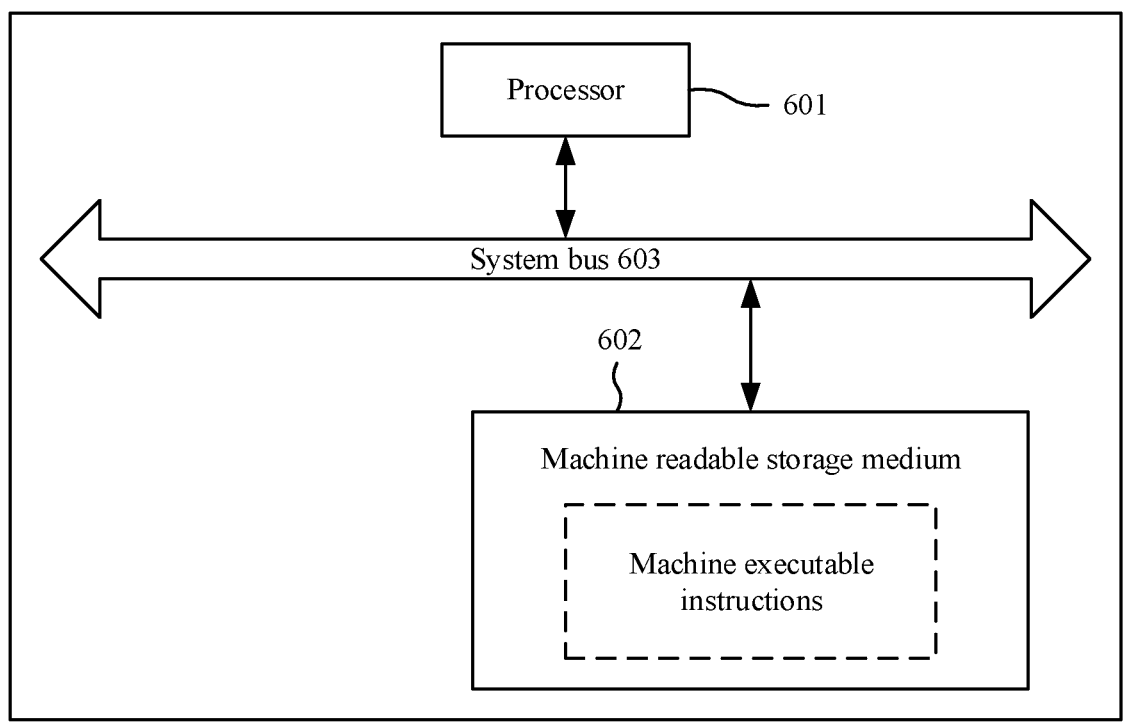
FIG. 6 is a diagram illustrating a hardware structure of an apparatus according to an example of the present disclosure.

Correspondingly, the present disclosure also provides a diagram illustrating a hardware structure of the apparatus shown in FIG. 5. As shown in FIG. 6, the hardware structure may include a processor 601, and a machine-readable storage medium 602 storing machine-executable instructions. The processor 601 may communicate with the machine-readable storage medium 602 via a system bus 603. Moreover, by reading and executing the machine-executable instructions stored on the machine-readable storage medium 602 and corresponding to a control logic for advertising a route, the processor 601 may execute the above-described method of advertising a route.

The machine-readable storage medium 602 described herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state disk, any type of storage disk (e.g., optical disk, Digital Video Disk (DVD)), or a similar storage medium, or a combination thereof.

Thus, the descriptions on the hardware structure shown in FIG. 6 are completed.

In the present disclosure, there is also provided a machine-readable storage medium including machine-executable instructions, for example, the machine-readable storage medium 602 in FIG. 6. The machine-executable instructions may be executed by the processor 601 in the apparatus for advertising a route to implement the method of advertising a route as described above.

The processor 601 may execute the operations in the above method of advertising a route by invoking and executing the machine-executable instructions that are stored on the machine-readable storage medium 602 and correspond to the control logic for advertising a route.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art can understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of advertising a route, comprising:
receiving, by a network device, a route advertised by a Border Gateway Protocol (BGP) neighbor;
distributing, by the network device, the route to hardware of the network device;
recording, by the network device, the route into a linked list of routes to be advertised;
determining, by the network device, a BGP state of the network device;
when the BGP state indicates waiting to advertise the route,
updating, by the network device, the BGP state to advertising the route after a set time length and advertising, by the network device, the route in the linked list of routes to be advertised; and
when the BGP state indicates advertising the route,
advertising, by the network device, the route in the linked list of routes to be advertised;
wherein distributing the route to the hardware of the network device, comprising:
comparing, by the network device, a number L of routes distributed to the hardware within a current routing period with a maximum number X of routes allowed to be distributed to the hardware when the route advertised by the BGP neighbor is received;
when L is less than X,
distributing, by the network device, the received route to the hardware and adding 1 to the number L of routes distributed to the hardware within the current routing period; and
when L is equal to X,
awaiting, by the network device, the current routing period to end and distributing the received route to the hardware in a next routing period.

2. The method according to claim 1, wherein updating the BGP state to advertising the route after the set time length comprises:
determining, by the network device, whether a WAIT-TIMER corresponding to the network device has been started;
awaiting, by the network device, the WAIT-TIMER to expire when the WAIT-TIMER has been started;
starting, by the network device, the WAIT-TIMER when the WAIT-TIMER has not been started, and awaiting the WAIT-TIMER to expire; and
updating, by the network device, the BGP state to advertising the route when the WAIT-TIMER expires.

3. The method according to claim 2, wherein the method further comprising:
starting, by the network device, a RESET TIMER corresponding to the network device when the BGP state is updated to advertising the route.

4. The method according to claim 3, wherein advertising the route in the linked list of routes to be advertised comprises:
comparing, by the network device, a number Z of routes advertised within the current routing period with a maximum number Y of routes allowed to be advertised;
when Z is less than Y,
selecting, by the network device, a route for being advertised from the linked list of routes to be advertised,
adding 1 to the number Z of routes advertised within the current routing period, and
returning to perform the operation of comparing Z with Y; and
when Z is equal to Y,
awaiting, by the network device, the current routing period to end and returning to perform the operation of comparing Z with Y in the next routing period.

5. The method according to claim 4, wherein after selecting the route for being advertised from the linked list of routes to be advertised and adding 1 to the number Z of routes advertised within the current routing period when Z is less than Y, the method further comprising:
deleting, by the network device, the advertised route from the linked list of routes to be advertised;
determining, by the network device, whether the linked list of routes to be advertised is empty;
when the linked list of routes to be advertised is not empty, resetting, by the network device, the RESET-TIMER, and returning to perform the operation of comparing Z with Y;

when the linked list of routes to be advertised is empty, determining, by the network device, whether the RESET-TIMER expires;

when the RESET-TIMER does not expire,
awaiting, by the network device, the RESET-TIMER to expire and
updating, by the network device, the BGP state of the network device to waiting to advertise the route when the RESET-TIMER expires; and when the RESET-TIMER expires,
updating, by the network device, the BGP state of the network device to waiting to advertise the route.

6. The method according to claim 5, wherein:
the maximum number X of routes allowed to be distributed to the hardware is greater than the maximum number Y of routes allowed to be advertised within a same routing period; and
a time length of the RESET-TIMER is set greater than the set time length of the WAIT-TIMER.

7. A network device, comprising:
a processor; and
a non-transitory machine-readable storage medium storing machine-executable instructions, wherein by executing the machine-executable instructions, the processor is caused to:
receive a route advertised by a Border Gateway Protocol (BGP) neighbor;
distribute the route to hardware of the network device;
record the route into a linked list of routes to be advertised;
determine a BGP state of the network device;
when the BGP state indicates waiting to advertise the route,
update the BGP state to advertising the route after a set time length and
advertise the route in the linked list of routes to be advertised; and
when the BGP state indicates advertising the route,
advertise the route in the linked list of routes to be advertised;
wherein when distributing the route to the hardware of the network device, the processor is further caused by the machine-executable instructions to:
compare a number L of routes distributed to the hardware within a current routing period with a maximum number X of routes allowed to be distributed to the hardware when the route advertised by the BGP neighbor is received;
when L is less than X,
distribute the received route to the hardware and add 1 to the number L of routes distributed to the hardware within the current routing period; and
when L is equal to X,
await the current routing period to end and distribute the received route to the hardware in a next routing period.

8. The network device according to claim 7, wherein when updating the BGP state to advertising the route after the set time length, the processor is further caused by the machine-executable instructions to:
determine whether a WAIT-TIMER corresponding to the network device has been started;

await the WAIT-TIMER to expire when the WAIT-TIMER has been started;
start the WAIT-TIMER when the WAIT-TIMER has not been started, and await the WAIT-TIMER to expire; and
update the BGP state to advertising the route when the WAIT-TIMER expires.

9. The network device according to claim 8, wherein the processor is further caused by the machine-executable instructions to:
start a RESET TIMER corresponding to the network device when the BGP state is updated to advertising the route.

10. The network device according to claim 9, wherein when advertising the route in the linked list of routes to be advertised, the processor is further caused by the machine-executable instructions to:
compare a number Z of routes advertised within the current routing period with a maximum number Y of routes allowed to be advertised;
when Z is less than Y,
select a route for being advertised from the linked list of routes to be advertised,
add 1 to the number Z of routes advertised within the current routing period, and
return to perform the operation of comparing Z with Y; and
when Z is equal to Y,
await the current routing period to end and return to perform the operation of comparing Z with Y in a next routing period.

11. The network device according to claim 10, wherein after selecting the route for being advertised from the linked list of routes to be advertised and adding 1 to the number Z of routes advertised within the current routing period when Z is less than Y, the processor is further caused by the machine-executable instructions to:
delete the advertised route from the linked list of routes to be advertised;
determine whether the linked list of routes to be advertised is empty;
when the linked list of routes to be advertised is not empty,
reset the RESET-TIMER, and return to perform the operation of comparing Z with Y;
when the linked list of routes to be advertised is empty, determine whether the RESET-TIMER expires;
when the RESET-TIMER does not expire,
await the RESET-TIMER to expire and
update the BGP state of the network device to waiting to advertise the route when the RESET-TIMER expires; and
when the RESET-TIMER expires,
update the BGP state of the network device to waiting to advertise the route.

12. The network device according to claim 11, wherein:
the maximum number X of routes allowed to be distributed to the hardware is greater than the maximum number Y of routes allowed to be advertised within a same routing period; and
a time length of the RESET-TIMER is set greater than a time length of the WAIT-TIMER.

* * * * *